US009133859B2

(12) United States Patent
Weber

(10) Patent No.: US 9,133,859 B2
(45) Date of Patent: Sep. 15, 2015

(54) PRESSURE STORE

(75) Inventor: Norbert Weber, Sulzbach/Saar (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 0 days.

(21) Appl. No.: 13/261,550

(22) PCT Filed: Jun. 17, 2011

(86) PCT No.: PCT/EP2011/002989
§ 371 (c)(1),
(2), (4) Date: Feb. 4, 2013

(87) PCT Pub. No.: WO2012/000616
PCT Pub. Date: Jan. 5, 2012

(65) Prior Publication Data

US 2013/0126026 A1 May 23, 2013

(30) Foreign Application Priority Data

Jun. 30, 2010 (DE) ........................ 10 2010 025 627

(51) Int. Cl.
*F16L 55/04* (2006.01)
*F15B 1/10* (2006.01)
*F15B 1/14* (2006.01)

(52) U.S. Cl.
CPC ... *F15B 1/10* (2013.01); *F15B 1/14* (2013.01); *F15B 2201/205* (2013.01); *F15B 2201/3152* (2013.01); *F15B 2201/3158* (2013.01)

(58) Field of Classification Search
USPC ........................................................... 138/30
See application file for complete search history.

(56) References Cited

U.S. PATENT DOCUMENTS 2,401,792 A * 6/1946 Overbeke ........................ 138/30
3,003,522 A * 10/1961 Rohacs ........................... 138/30
3,195,577 A * 7/1965 Greer .............................. 138/30
3,209,785 A * 10/1965 Mercier ........................ 220/530
3,230,976 A * 1/1966 Mercier .......................... 138/30
3,232,318 A * 2/1966 Mercier .......................... 138/30
3,279,499 A * 10/1966 Mercier .......................... 138/30
3,319,420 A * 5/1967 Mercier .......................... 138/30

(Continued)

FOREIGN PATENT DOCUMENTS

DE 38 10 509 A1 10/1988
DE 195 24 920 A1 1/1997

(Continued)

*Primary Examiner* — James Hook
(74) *Attorney, Agent, or Firm* — Roylance, Abrams, Berdo & Goodman LLP

(57) ABSTRACT

A pressure store includes a housing (2) having a first sub-chamber (8) arranged between the housing (2) and a flexible separating diaphragm (40), a second sub-chamber (54) arranged between the separating diaphragm (40) and a supporting body (48), and a third sub-chamber (28) encompassed by the supporting body (48). The first sub-chamber (8) can be filled with a first fluid. The second sub-chamber (54) and the third sub-chamber (28) are connected to one another in fluid-conducting fashion and can be filled with a second fluid. The first and the second sub-chambers (8, 54) vary in respective sizes as a result of movements of the separating diaphragm (40) as a function of the respective filling state. The first fluid is a storage medium and the second fluid is working medium. The second sub-chamber (54) is increased in size during the extraction of storage medium from the pressure store and is reduced in size during the filling of the pressure store with storage medium.

20 Claims, 3 Drawing Sheets

(56) References Cited

U.S. PATENT DOCUMENTS

| | | | | | |
|---|---|---|---|---|---|
| 3,322,154 | A | * | 5/1967 | Mercier | 138/30 |
| 3,741,250 | A | * | 6/1973 | Mercier | 138/30 |
| 3,893,485 | A | * | 7/1975 | Loukonen | 138/30 |
| 4,143,678 | A | * | 3/1979 | Sugimura et al. | 138/30 |
| 4,166,478 | A | * | 9/1979 | Sugimura et al. | 138/30 |
| 4,448,217 | A | * | 5/1984 | Mercier | 138/30 |
| 4,610,369 | A | * | 9/1986 | Mercier | 220/721 |
| 4,628,964 | A | * | 12/1986 | Sugimura et al. | 138/30 |
| 4,638,838 | A | | 1/1987 | Richard et al. | |
| 5,427,152 | A | * | 6/1995 | Weber | 138/30 |
| 6,017,099 | A | * | 1/2000 | Schneider et al. | 303/87 |
| 6,131,613 | A | * | 10/2000 | Jenski et al. | 138/30 |
| 6,789,577 | B2 | * | 9/2004 | Baltes | 138/30 |

FOREIGN PATENT DOCUMENTS

| | | | |
|---|---|---|---|
| DE | 101 13 415 | A1 | 10/2002 |
| EP | 1 243 798 | A1 | 9/2002 |
| GB | 877 800 | A | 9/1961 |
| WO | WO 03/085270 | A2 | 10/2003 |

* cited by examiner

PRESSURE STORE

FIELD OF THE INVENTION

The invention relates to a pressure store comprising compartments arranged in a housing. A first compartment is arranged between the housing and a flexible separating diaphragm. A second compartment is arranged between the separating diaphragm and a support body. A third compartment is encompassed by the support body. The first compartment is fillable with a first fluid. The second compartment and the third compartment are connected to one another to conduct fluid and are fillable with a second fluid. The first and second compartments vary in their respective sizes as a result of movements of the separating diaphragm as a function of the respective filling state.

BACKGROUND OF THE INVENTION

An accumulator disclosed DE 101 13 415 A1 is in the form of a hydropneumatic accumulator. A flexible separating element is in an accumulator housing formed by the end piece of a pipe. The element surrounds a support body having fluid passages. The support body, at least in individual sections, has a nonround cross-sectional shape. The separating element is anchored on the accumulator housing with the formation of a seal such that, on the outside and inside of the separating element, receiving spaces are formed which are separate from one another. A centrally located through bore forms a passage leading to the inner receiving space of the accumulator for a storage medium. There is a gas valve for filling the outside gas space. The known accumulator can be used for energy storage, for example, in conjunction with vehicle suspension system or as pulsation dampers. This known solution is especially well suited for damping of pressure peaks in hydraulic or other fluid-engineering systems. The known solution leaves much to be desired for use as an accumulator for storage media in the form of chemically corrosive fluids, such as a urea-water solution.

Another accumulator disclosed in DE 38 10 509 C2 comprises a main body of a tank with an outer pipe of cylindrical shape on whose one end there is a side plate and on whose other end there is a cover. At least one inlet opening and one outlet opening are formed on the outer pipe. A bladder or diaphragm subdivides the interior of the main body of the tank into a gas chamber and a liquid chamber, with an opening of the bladder being sealed tight by the cover. An insert is arranged to project into the bladder for the purpose of reducing the volume of the gas chamber. The insert is formed from a base part, a middle part, and a head part, with the head part being kept in contact with the bottom of the diaphragm. This arrangement permits preventing damage of the diaphragm by repeated contraction. In the contracted state, the bladder or diaphragm adjoins the insert.

Accumulators of this type are widely used in different sizes and structural configurations to receive and discharge variable volumes of pertinent fluids under the operating pressure of a fluid system that is connected on the fluid side. The bladder, which is under a preloading pressure of the working gas, forms a pressure cushion on its gas side. The operational reliability of the accumulator depends primarily on the accumulator bladder typically formed of a plastic material, especially butyl, which bladder is exposed not only to mechanical stresses in operation, but also needs to be resistant to chemically corrosive storage fluids, if possible. As has been shown, in conjunction with corrosive fluids such as urea-water solutions, so far to ensuring a problem-free service life of sufficient length for continuous operation, for example, over 20,000 hours, has not been possible.

"Urea injection" is being increasingly used in automotive engineering to reduce the nitrogen oxide (NOx) emissions by injection into the exhaust gas flow. In this type of application, achieving a long service life without problems in continuous operation is especially important.

SUMMARY OF THE INVENTION

An object of the invention is to provide an improved accumulator characterized by improved operational reliability in connection with corrosive storage media and therefore suitable especially for use in urea injection in automotive engineering.

This object is basically achieved according to the invention by an accumulator where the first fluid is a storage medium, and the second fluid is a working medium. The second compartment is enlarged when the storage medium is removed from the accumulator and reduced in size when the accumulator is filled with the storage medium. The amount of the working medium to be accommodated is defined by the volumes of the second and third compartment. When the first compartment is filled with the storage medium, the flexible separating diaphragm is moved such that the second compartment, which adjoins the third compartment outside the support body, is reduced in size. Accordingly, the second compartment is enlarged when the storage medium is removed from the first compartment or when the filling of the first compartment with the storage medium decreases.

Advantageously, the accumulator is designed as a hydropneumatic bladder accumulator for a gaseous working medium and/or a liquid storage medium. Especially preferably, the accumulator is designed for filling of a storage medium with a chemically corrosive fluid such as a urea-water solution. This capability affords the possibility of using the accumulator according to the invention in urea injection, especially in the automotive domain.

In one special configuration of the accumulator according to the invention, the support body and the separating diaphragm are shaped and dimensioned such that at a volumetric size of the first compartment exceeding a definable boundary value, in other words, at a volumetric size exceeding a maximum value for the storage medium to be accommodated, the support body forms a support for the separating diaphragm.

Advantageously, the housing and the separating diaphragm can be shaped and dimensioned such that the separating diaphragm at least partially adjoins the housing when the first compartment is completely emptied. Alternatively, the separating diaphragm can be shaped and dimensioned such that it is spaced apart from the support body and from the housing when the first compartment is completely emptied.

The support body and the housing then form an effective protection for the separating diaphragm against overstress at excess pressures in the first and second compartments by the separating diaphragm or the accumulator bladder being able to rest against the support body and the housing to be protected against being crushed at excess pressures. The reduced mechanical loading leads to a prolongation of the safe service life of the separating diaphragm, even if it is exposed to chemically corrosive media such as a urea-water solution.

Typically, the housing has a head part forming the closure of the housing and bordering the second and/or third compartment. The housing is advantageously made cup-shaped, with the first compartment being arranged on the bottom. In the head part, a connection device for the second fluid can be provided.

Also advantageously the head part has a retaining body on it on which the opening edge of the separating diaphragm is anchored. The retaining body preferably forms a retaining part on which the support body is arranged. This arrangement yields an especially compact construction of the accumulator.

In one special configuration of the accumulator according to the invention, the retaining body has the shape of a bell whose jacket surrounds a fourth compartment bordering the third compartment. In this way, the intake capacity of the accumulator for the second fluid or the typically gaseous working medium is enlarged. At the same time, the material demand for forming the accumulator is reduced.

In especially advantageous exemplary configurations, the support body has the shape of a body of revolution made rounded and closed on the end facing the first compartment and provided with at least one lateral wall opening as a passage site between the second and third compartments. In this configuration, the support body for the separating diaphragm or accumulator bladder can form a large-area support so that the accumulator bladder, which has essentially no folds at excess pressures, is optimally protected.

With respect to the configuration of the head part, the arrangement can be advantageously made such that the head part has a cover part screwed to the housing with inside wall parts in the form of a spherical cap concentric to the axis of the housing. Within the cover part, the retaining body is arranged such that between its outside wall in the form of spherical surface parts and the inside wall parts of the cover part, a gap is formed for accommodating an edge region of the separating diaphragm bordering the opening edge.

Especially reliable anchoring of the separating diaphragm can be achieved when the retaining body in a region axially offset from its retaining part in the direction of the connection device has an annular groove. The annular groove is machined into the outside wall and is engaged by an edge bead surrounding the opening edge of the separating diaphragm for the anchoring of the separating diaphragm.

In especially advantageous exemplary embodiments, the connection device has a screw fitting extending through an opening of the cover part concentric to the central axis. The screw fitting pulls the retaining body against the inside wall of the cover part by screwing to the cover part and clamps the edge region of the separating diaphragm located in the gap.

Especially advantageously, the retaining body in the region of the retaining part forms a circular cylinder on whose edge region catch elements are formed. With counter-elements on the support body, the edge region catch elements form a snap connection anchoring the support body. This type of anchoring of the support body is especially easy to mount and provides low production costs.

The catch elements on the outer wall of the retaining part can be offset from its end edge and can be formed by depressions of the outer wall of the retaining part into which a bead-like projection protruding radially to the inside, can be snapped on the inside of the support body.

Alternatively, the catch elements on the inside wall of the retaining part can be formed by a depression axially at a distance from its end edge and a projection adjoining the end edge and protruding radially to the inside. The catch elements can be latched to counter-elements by catch fingers distributed over the periphery of the opening of the support body. In a collar of individual catch fingers formed in this way, mounting is made especially simple and convenient. The corresponding applies to exemplary configurations in which latching takes place on the outside of the retaining part. In this case, individual catch fingers on the end edge of the support body can also be provided.

The support body is preferably formed from a plastic material. Especially advantageously in this case, it can be glass fiber-reinforced polyacrylamide, IXEF® brand. This material, compared to conventional glass fiber-reinforced plastics, is characterized by a smooth, closed outer skin. Due to these properties, the retaining body and/or the connection device can also be advantageously formed from this material.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
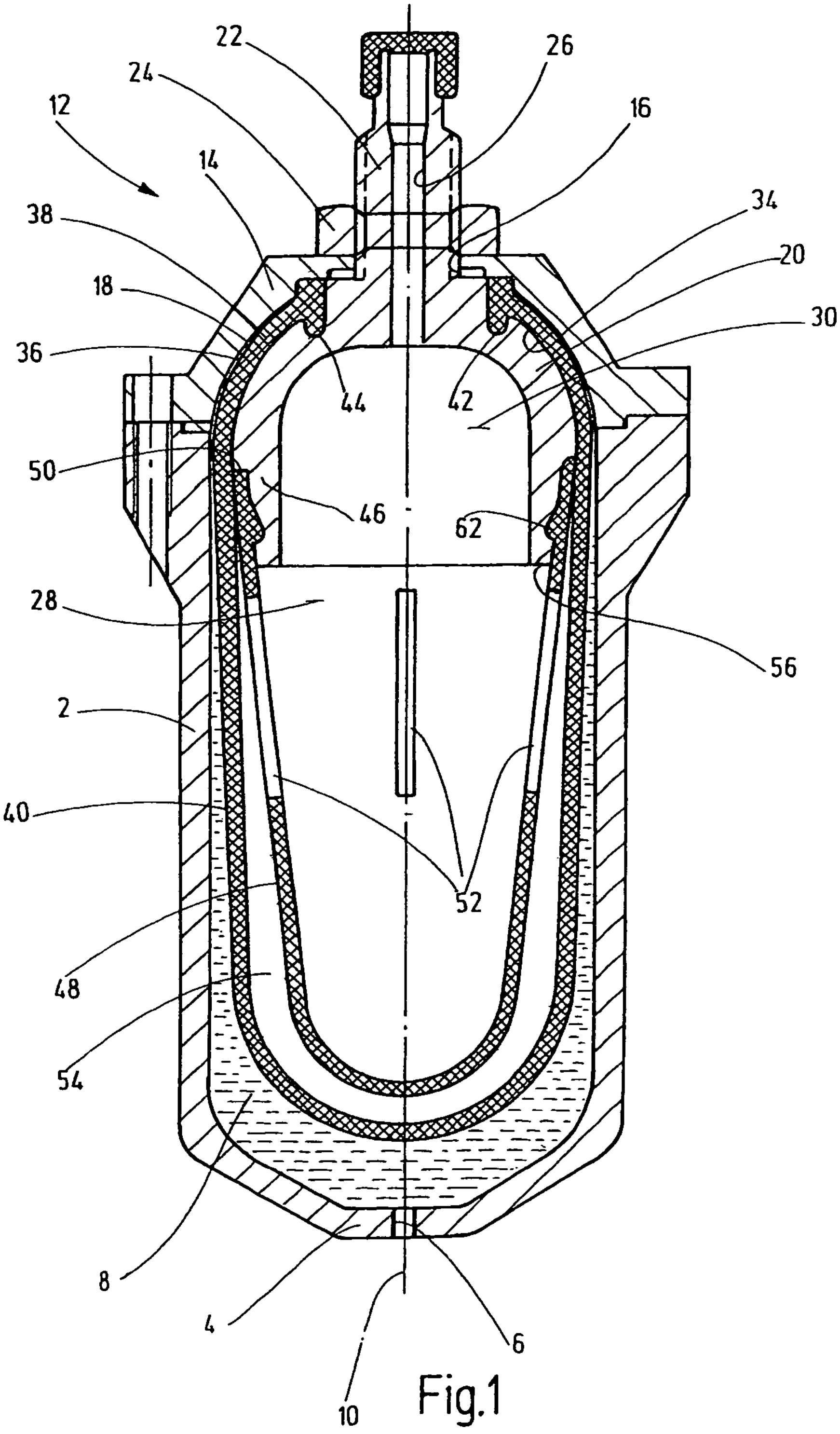
FIG. 1 is a side elevational view in section of an accumulator according to a first exemplary embodiment of the invention shown only slightly enlarged compared to a practical embodiment.

The invention is explained below using the example of an accumulator for a urea injection system. FIG. 1 shows a first exemplary embodiment of the accumulator. An accumulator housing 2 for the most part has the shape of a circularly cylindrical cup. On the housing closed bottom 4, a through-flow opening 6 is located. The opening 6 which is aligned to the central longitudinal axis 10 and enables supply and discharge of a first fluid, such as a urea-water solution, to or from the first compartment 8 located in the housing 2 bordering the bottom 4. A head part 12 can be screwed to the accumulator housing 2 and forms the fluid-tight closure of the upper open end of the housing 2.

The head part 12 has an outer cover part 14 on which the screw coupling to the housing 2 is formed. The outer cover part 14 can be formed of a metallic material, for example, of aluminum, as can the housing 2. Alternatively, the cover part 14 can be formed from a structurally strong plastic material. The outer cover part 14 has a central opening 16 concentric to the axis 10. At a short distance from the opening 16, the cover part 14 has inner wall parts in the form of a spherical cap 18 concentric to the axis 10. Within the cover part 14, the head part 12 has a retaining body 20 with a screw fitting 22 forming the connection device for the second fluid, which is located integrally on the retaining body and extending through the opening 16 of the cover part 14. The retaining body 20 is fixed within the cover part 14 by interaction with a nut 24 on screw fitting 22. A central fluid channel 26 extends through the screw fitting 22 to fill a third compartment 28 with the working medium under a preloading pressure as the second fluid. A valve insert (not shown) is arranged within the channel 26.

The retaining body 20 has the shape of a bell whose jacket surrounds a fourth compartment 30 bordering the third compartment 28. The bell jacket on its outside wall forms spherical surface parts 34 defining between themselves and the spherical cap 18 of the cover part 14 a clamping gap 36 for the anchoring region 38 of a separating diaphragm 40, which region is arranged in the gap 36. The bladder is formed from a plastic such as butyl, suitable for these types of accumulators, and forms the flexible separating diaphragm 40 between the third compartment 28 and the second compartment 54. The retaining body 20 between the end of the outer spherical surface part 34 and the screw fitting 22 has an annular groove 42 which for especially reliable anchoring of the separating diaphragm 40 by engaging an edge bead 44 surrounding its opening edge.

The retaining body 20 with the bell located within the bladder formed by the separating diaphragm 40 forms a retaining part 46 for the anchoring of a generally V-shaped support body 48 projecting into the interior of the bladder and tapering from its connection to the retaining part 46. The support body 48 is formed from a relatively structurally strong plastic material. Glass fiber-reinforced polyacrylamide, IXEF® brand, has proven itself especially well suited for that material. As FIG. 1 shows, the support body 48 has the shape of a body of revolution with a spherically rounded, closed lower end located at a distance from the bottom 4 of the housing 2 and surrounds a third compartment 28 bordering the fourth compartment 30. The other upper end 50 of the support body 48 is fixed on the retaining part 46 by a snap connection. As FIG. 1 moreover shows, the support body 48 in a longitudinal section is somewhat V-shaped and has side wall openings 52 for the passage of the working fluid to the second compartment 54 bordering the third compartment 28.

Figure 2:
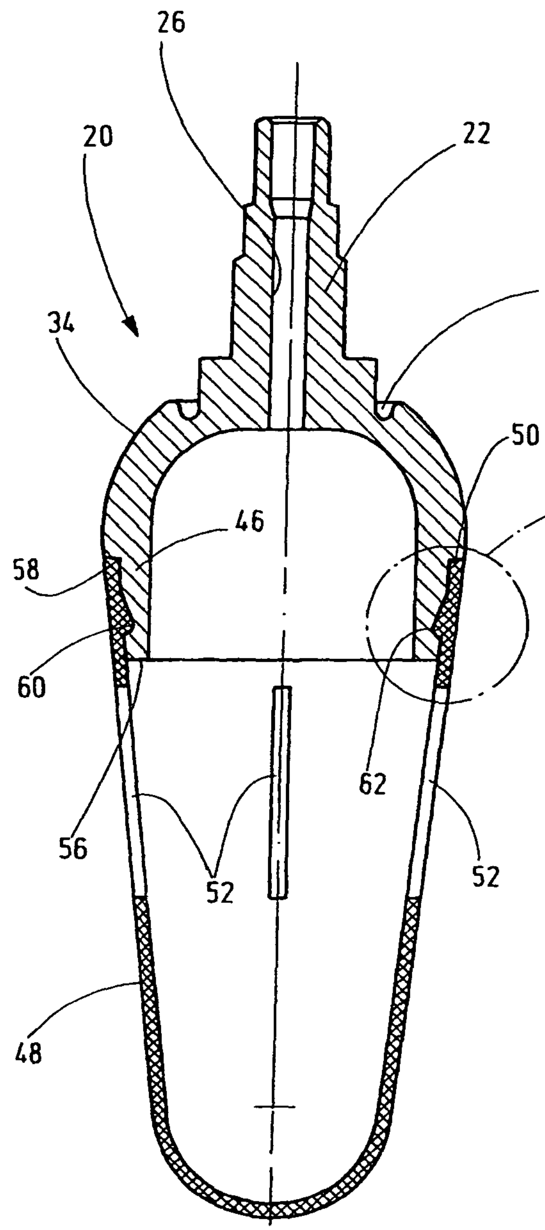
FIG. 2 is a side elevational view in section of only one retaining body with the support body fixed thereon for the accumulator of FIG. 1.
Figure 3:
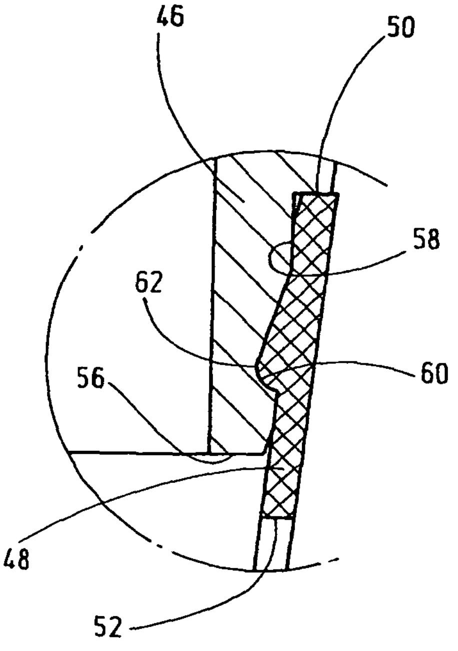
FIG. 3 is a partial, side elevational view in section of the region III in FIG. 2, greatly enlarged compared to FIG. 2.

The details of the snap connection are best illustrated in FIGS. 2 and 3. As is apparent, at a short distance from the end edge 56 of the retaining part 46, depressions 60 are formed in which the end region of the support body 48 can be accommodated. A projection 62 of the support body 48 protrudes radially to the inside and can be snapped into the depressions 60. The retaining body 20 in this example, in the same manner as the support body 48 and the valve located in the channel 26 of the fitting 22, is formed from glass fiber-reinforced polyacrylamide, IXEF® brand, so that the retaining body 20 with the support body 48 fixed thereon forms a unit made completely of plastic.

In operation, when used for urea injection, the first compartment 8 of the accumulator is filled with the urea-water solution by a pump until an upper value of the system pressure of the system pressure is reached and the pump shuts off. The storage medium for metered injection is forced into the system by the accumulator pressure. When a lower pressure value is reached, the pump starts again. If unwanted excess pressures should occur and a certain boundary value of the volume increase of the first compartment 8 is exceeded, the separating diaphragm 40 rests against the support body 48 and is thus protected against overload and damage.

Figure 4:
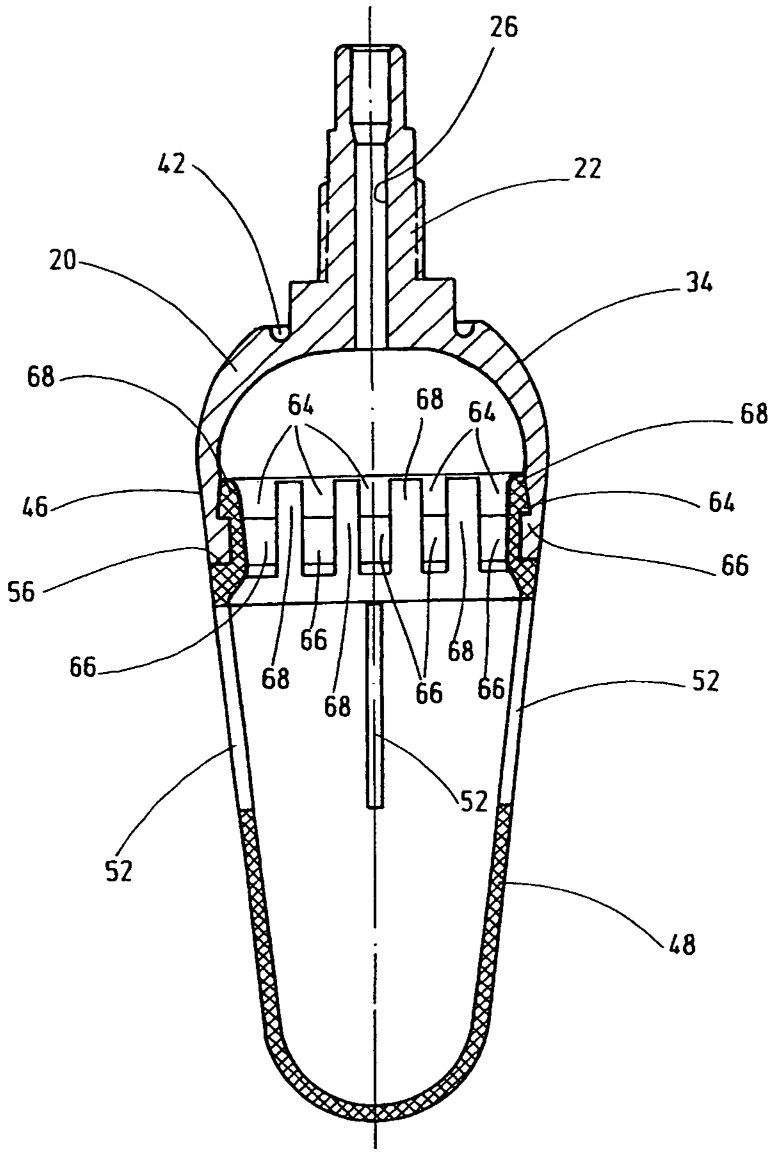
FIG. 4 is a side elevational view in section of one retaining body with a support body fixed thereon according to a second exemplary embodiment of the invention, particularly as to the latching of the support body on the retaining body.

FIG. 4 shows another version of the configuration of the snap connection between support body 48 and retaining body 20. Catch elements are arranged on the inner wall of the retaining part 46 of the retaining body 20. As FIG. 4 shows, it is a depression 64 which is axially at a distance from the end edge 56. A projection 66 adjoins the end edge 56 and protrudes radially to the inside. The counter-elements on the side of the support body 48 are formed by retaining fingers 68 arranged or distributed over the periphery of the opening of the support body 48. With counter-elements formed by individual catch fingers 68, the establishment of the latching is made especially simple and convenient.

In the embodiment of the latching shown in FIGS. 2 and 3, on the outside of the retaining part 46 of the retaining body 20, the counter-elements of the support body 48 could also be formed from individual, peripherally distributed catch fingers.

While various embodiments have been chosen to illustrate the invention, it will be understood by those skilled in the art that various changes and modifications can be made therein without departing from the scope of the invention as defined in the appended claims.

What is claimed is:

1. An accumulator, comprising:

a housing having a head part forming a closure of said housing, said head part having a cover part and a retaining body with a bell shape and a jacket;

a flexible separating diaphragm in said housing, said retaining body anchoring an opening edge of said diaphragm and extending within said housing beyond a connection between said cover part and said housing, said diaphragm having an inside surface engaging said retaining body and having an outside surface engaging said cover part and said housing on opposite axial sides of the connection in all diaphragm positions thereof;

a first compartment in said housing between said housing and said diaphragm and filled with a storage medium;

a support body in said housing and within said diaphragm, said support body being a body of revolution and having at least one lateral wall opening;

a second compartment between said diaphragm and said support body, said first and second compartments varying in respective sizes thereof resulting from movements of said diaphragm as a function of filling state of said storage medium, said second compartment being enlarged when said storage medium is removed from said housing and being reduced in size when said housing is filled with said storage medium;

a third compartment encompassed by said support body and located in said housing, said second compartment being connected to said third compartment in fluid communication via said lateral wall opening, said second and third compartments being filled with a working medium, said head part bordering at least one of said second compartment and said third compartment; and a fourth compartment in said housing bordering said third compartment, said jacket surrounding said fourth compartment.

2. An accumulator according to claim 1 wherein the working medium is a gas; and said storage medium is a liquid.

3. An accumulator according to claim 2 wherein said liquid is chemically corrosive.

4. An accumulator according to claim 3 wherein said liquid is a urea-water solution.

5. An accumulator according to claim 1 wherein said retaining body comprises a retaining part, said support body being coupled to said retaining part.

6. An accumulator according to claim 5 wherein said retaining part comprises an annular groove axially offset from a connection for said working medium of said retaining body along a longitudinal axis of said housing, said annular groove being machined into an outside wall of said retaining part and being engaged by an edge bead surround said opening edge of said diaphragm.

7. An accumulator according to claim 5 wherein said retaining body comprises a circular cylinder in a region of said retaining part, said retaining part having catch elements on an edge region thereof forming a snap connection with counter-elements on said support body anchoring said support body to said retaining part.

8. An accumulator according to claim 7 wherein said catch elements comprise depressions in an outer wall of said retaining part and are offset from an end edge of said retaining part; and said counter elements comprise a bead-shaped projection protruding radially on an inside wall of said support body.

9. An accumulator according to claim 7 wherein said catch elements are on an inside wall of said retaining part and comprise a depression located at an axial distance along a longitudinal axis of said housing from an end edge of said retaining part and a projection adjoining said end edge and protruding radially inwardly toward said longitudinal axis; and said counter-elements comprise catch fingers distributed along a periphery of an opening of said support body latched to said catch elements.

10. An accumulator according to claim 1 wherein said cover part is connected by screws to said housing and has an inside wall forming a spherical cap concentric to a longitudinal axis of said housing, said retaining body being arranged within said cover part and having an outside wall forming spherical surface parts, a gap between said spherical cap and said spherical wall parts receiving an edge region of said diaphragm bordering said opening edge thereof.

11. An accumulator according to claim 10 wherein a screw fitting extends through an opening in said cover part, said opening being concentric with said longitudinal axis, said screw fitting pulling said retaining body against said inside wall of said cover part by a threaded coupling, thereby clamping said edge region of said diaphragm in said gap.

12. An accumulator according to claim 1 wherein said support body is formed of glass fiber reinforced polyacrylamide.

13. An accumulator, comprising:

a housing having a head part forming a closure of said housing, said head part having a retaining body with a bell shape, a jacket and having a cover part connected by screws to said housing, said cover part having an inside wall forming a spherical cap concentric to a longitudinal axis of said housing, said retaining body being arranged within said cover part and having an outside wall forming spherical surface parts;

a flexible separating diaphragm in said housing, said retaining body anchoring an opening edge of said diaphragm, a gap between said spherical cap and said spherical wall parts receiving an edge region of said diaphragm bordering said opening edge thereof;

a first compartment in said housing between said housing and said diaphragm and filled with a storage medium;

a support body in said housing and within said diaphragm, said support body being a body of revolution having at least one lateral wall opening;

a second compartment between said diaphragm and said support body, said first and second compartments varying in respective sizes thereof resulting from movements of said diaphragm as a function of filling state of said storage medium, said second compartment being enlarged when said storage medium is removed from said housing and being reduced in size when said housing is filled with said storage medium;

a third compartment encompassed by said support body and located in said housing, said second compartment being connected to said third compartment in fluid communication via said lateral wall opening, said second and third compartments being filled with a working medium, said head part bordering at least one of said second compartment and said third compartment; and a fourth compartment in said housing bordering said third compartment, said jacket surrounding said fourth compartment.

14. An accumulator according to claim 13 wherein a screw fitting extends through an opening in said cover part, said opening being concentric with said longitudinal axis, said screw fitting pulling said retaining body against said inside wall of said cover part by a threaded coupling, thereby clamping said edge region of said diaphragm in said gap.

15. An accumulator according to claim 13 wherein said retaining body comprises a retaining part, said support body being coupled to said retaining part; and said retaining body comprises a circular cylinder in a region of said retaining part, said retaining part having catch elements on an edge region thereof forming a snap connection with counter-elements on said support body anchoring said support body to said retaining part.

16. An accumulator according to claim 15 wherein said catch elements comprise depressions in an outer wall of said retaining part and are offset from an end edge of said retaining part; and said counter-elements comprise a bead-shaped projection protruding radially on an inside wall of said support body.

17. An accumulator according to claim 15 wherein said catch elements are on an inside wall of said retaining part and comprise a depression located at an axial distance along a longitudinal axis of said housing from an end edge of said retaining part and a projection adjoining said end edge and protruding radially inwardly toward said longitudinal axis; and said counter-elements comprise catch fingers distributed along a periphery of an opening of said support body latched to said catch elements.

18. An accumulator, comprising:

a housing having a head part forming a closure of said housing, said head part having a retaining body with a bell shape and a jacket, said retaining body including a retaining part and forming a circular cylinder in a region of said retaining part, said retaining part having catch elements on an edge region thereof;

a flexible separating diaphragm in said housing, said retaining body anchoring an opening edge of said diaphragm;

a first compartment in said housing between said housing and said diaphragm and filled with a storage medium;

a support body in said housing and within said diaphragm, said support body being a body of revolution and being coupled to said retaining part, said catch elements forming a snap connection with counter-elements on said support body anchoring said support body to said retaining part, said support body having at least one lateral wall opening;

a second compartment between said diaphragm and said support body, said first and second compartments varying in respective sizes thereof resulting from movements of said diaphragm as a function of filling state of said storage medium, said second compartment being enlarged when said storage medium is removed from said housing and being reduced in size when said housing is filled with said storage medium;

a third compartment encompassed by said support body and located in said housing, said second compartment being connected to said third compartment in fluid communication via said lateral wall opening, said second and third compartments being filled with a working medium, said head part bordering at least one of said second compartment and said third compartment; and a fourth compartment in said housing bordering said third compartment, said jacket surrounding said fourth compartment.

19. An accumulator according to claim 18 wherein said catch elements comprise depressions in an outer wall of said retaining part and are offset from an end edge of said retaining part; and said counter-elements comprise a bead-shaped projection protruding radially on an inside wall of said support body.

20. An accumulator according to claim 18 wherein said catch elements are on an inside wall of said retaining part and comprise a depression located at an axial distance along a longitudinal axis of said housing from an end edge of said retaining part and a projection adjoining said end edge and protruding radially inwardly toward said longitudinal axis; and said counter-elements comprise catch fingers distributed along a periphery of an opening of said support body latched to said catch elements.

* * * * *